United States Patent Office 3,285,965
Patented Nov. 15, 1966

3,285,965
PROCESS FOR THE PRODUCTION OF BROMINE DERIVATIVES OF AROMATIC COMPOUNDS
Herbert Jenkner, Cologne-Bruck, Germany, assignor to Chemische Fabrik Kalk G.m.b.H., Cologne-Kalk, Germany
No Drawing. Filed Oct. 28, 1963, Ser. No. 319,585
Claims priority, application Germany, Dec. 5, 1962, C 28,581
10 Claims. (Cl. 260—612)

The present invention relates to an improved process for the bromination of aromatic compounds containing at least two uncondensed benzene rings and especially diphenyl, diphenylether and mixtures thereof, to produce bromine substitution products thereof containing at least 4 atoms of bromine per mol.

A number of processes have already been suggested for the production of bromine derivatives of aromatic compounds containing a plurality of non-condensed benzene rings containing more than 3 bromine atoms per molecule. For example, bromine derivatives of diphenyl containing more than 3 bromine atoms per mol can be prepared by splitting off the $NH_2$ groups from the corresponding bromine derivatives of benzidine. The starting bromine derivatives of benzidine can in themselves be prepared by brominating acetylated benzidine in glacial acetic acid. The direct bromination of diphenyl even under the most severe conditions such as, for example, with the aid of heat or the addition of oleum and the like only results in the production of the dibromo derivatives of diphenyl.

The pentabromo derivatives of diphenyl ether, on the other hand, are more easily obtained. They are produced by the action of bromine on diphenyl ether in the presence of halogenation catalysts at temperatures over 75° C. If diphenyl ether is brominated at a temperature below 75° C. aside from the substitution of hydrogen atoms by bromine atoms an addition of bromine occurs at the double bond. As a result, compounds are produced which can only be separated from the desired bromine derivative of diphenyl ether with great difficulty. The bromine addition products can in part be destroyed by heating the reaction mixture to temperatures between 250 and 350° C. but decomposition products, especially, phenols, are produced which also are difficult to remove from the desired product and impart an undesirable odor thereto. Such odor is especially disturbing when bromine derivatives which have been treated in this manner are employed to flameproof synthetic resins. On the other hand, the presence of bromine addition products in the bromine substitution products produces a very negative effect upon the physical and mechanical properties of synthetic resins flameproofed with such contaminated products.

A certain improvement has been made in the production of bromine derivatives of aromatic compounds containing a plurality of uncondensed benzene rings in the recent proposal according to which aromatic compounds such as diphenyl or diphenyl ether are brominated at temperatures up to 50° C. in a substantially inert solvent such as carbon tetrachloride in the presence of halogenation catalysts. It is of the essence of such process that, in addition to bromine, chlorine is also introduced into the reaction mixture to oxidize the hydrogen bromide produced during the reaction in the reaction vessel to free bromine. However when such process was carried out on a large commercial scale it was found that such process had certain drawbacks. For example, to be able to attain a sufficient yield and a commercially useable product it was necessary to employ at least a 20% by weight bromine excess. This excess of bromine must at the end of the bromination be converted with reducing agents to less valuable products which cannot be reused in the process. A further serious disadvantage of such process is the formation of chloro-bromo-methanes and carbon tetrabromide in large scale commercial operations because of transhalogenation of the carbon tetrachloride used as solvent. Entirely aside from the unnecessary losses in bromine engendered thereby, such chloro-bromo-methanes and carbon tetrabromide are difficult and costly to remove from the brominated aromatic products. On the other hand, commercial applications, such as in flame-proofing of polyolefins, are substantially limited if the usually odorless and physiologically acceptable bromine derivatives of aromatic compounds containing a plurality of non-condensed benzene rings are contaminated with the strong smelling and toxic chloro-bromo-methanes. In addition, the presence of such impurities increases the normally slight tendency of the bromine derivatives to sweat out of the synthetic resin.

As a consequence methods for the production of bromine derivatives of aromatic compounds containing a plurality of non-condensed benzene rings which do not have the above-mentioned drawbacks were sought after.

According to the invention a particularly advantageous process for the production of bromine derivatives of aromatic compounds containing a plurality of non-condensed benzene rings and at least 4 bromine atoms was found in that the bromination is carried out using 1.01 to 1.2 gram atoms of bromine per gram atom of hydrogen which is to be substituted in conjunction with a quantity of chlorine which at most is equimolar with respect to the quantity of bromine supplied and that after completion of the bromination the reaction mixture is treated with a quantity of an alkylene of up to 4 carbon atoms which is at least equimolar with respect to the quantity of free bromine still contained in the reaction mixture.

The process according to the invention is applicable to aromatic compounds containing a plurality of non-condensed benzene rings as in di-, tri- and tetraphenyl methane and in particular to diphenyl, diphenyl ether and mixtures thereof. For sake of simplicity in the following the aromatic compounds containing a plurality of non-condensed benzene rings to which the process according to the invention is applicable will be designated simply as "aromatics" and the bromine derivatives thereof containing at least 4 bromine atoms will be designated simply as "bromine derivates."

The aromatics may be brominated in the process according to the invention without addition of a solvent, but in some instances the viscosity of the reaction mixture increases to such an extent during the bromination that it is advantageous to carry out the bromination in the presence of a solvent. The alkylene dihalides, especially, the alkylene dichlorides and the alkylene dibromides containing 2 to 4 carbon atoms such as the ethylene-, propylene-, butylene-, isobutylene dichlorides or dibromides, are employed as such solvent. Ethylene dibromide and propylene dibromide are preferred. The quantity of alkylene dihalide employed depends upon the solubility therein of the aromatics to be bromated and the viscosity of the reaction mixture during the bromination. Preferably, the quantity of alkylene dihalide selected is such that at least a portion of the aromatic to be brominated is at least partially or completely dissolved therein and that the reaction mixture during the bromination remains stirrable. The quantity of alkylene dihalide required for this purpose can be ascertained for each case by simple preliminary tests. In most instances 0.5 to 3.0 mol of alkylene dihalide, especially of ethylene dibromide or propylene dibromide, per mol of aromatic to be brominated suffice.

The bromination according to the invention of the aromatic or its solution in the alkylene dihalide preferably is carried out in the presence of small quantities of halogenation catalysts, such as iron, vanadium, titanium, aluminum or their halides and/or iodine. The quantity of such halogenation catalyst in general should be about 0.03 to 4 g. per mol of aromatic to be brominated. Often it is sufficient if the bromination is carried out in vessels the walls of which contain a sufficient quantity of the metals indicated. Small quantities of water which may be present in the reaction mixture do not disturb the progress of bromination or the results. In fact, it can be advantageous if the reaction mixture contains 0.005 to 1.0% by weight of water.

Preferably a temperature between 20 and 65° C. is maintained in the reaction mixture during the bromination. The bromine and chlorine required for the bromination according to the invention can be supplied to the reaction mixture in the form of a mixture or separately at different locations. The quantity of bromine supplied must be such as to provide 1.01 to 1.2 gram atoms of bromine per gram atom of hydrogen to be substituted in the aromatic and the quantity of chlorine supplied should approximate the quantity of bromine supplied and at most be equimolar with respect thereto. It is also possible first to supply a portion of the bromine required and then to introduce the remainder of the bromine together with the chlorine.

The bromination of aromatics according to the invention in the absence of a solvent surprisingly can also be carried out at temperatures between 20 and 65° C. without occurrence of any addition of bromine or chlorine to the aromatic double bonds.

Advantageously according to the invention the bromine and chlorine are supplied to the reaction mixture in such a manner that a slight excess of bromine is always maintained during the progress of the bromination and that such excess is only chemically bound after conclusion of the bromination. According to the invention the use of alkylenes of 2–4 carbon atoms was found particularly advantageous for chemically binding the excess bromine remaining after completion of the bromination. The quantity of such alkylene is at least equimolar with respect to such excess bromine. While ethylene and propylene have proved particularly suited for this purpose butylene and isobutylene can also be used. The alkylene supplied to the reaction mixture reacts with the excess bromine contained therein to produce the corresponding alkylene dibromide which can easily be removed by distillation.

When the process according to the invention is carried out in the presence of an alkylene dibromide or solvent, surprisingly no transhalogenation thereof occurs. Only when an alkylene dichloride is used as solvent does a slight but still noticeable transhalogenation occur whereby a portion of the chlorine contained in the dichloride is replaced by bromine. In any event the products of such transhalogenation of the alkylene halide used as solvent in every case are low boiling compounds which easily can be distilled off from the reaction mixture. The use of alkylene bromides as solvents which correspond to the alkylene used to bind the excess bromine remaining at the end of the bromination is particularly advantageous as the additional alkylene dibromide formed from the alklene cover the unavoidable losses of solvent so that the alkylene dibromide separated from the bromine derivatives can be reused as often as desired without replenishment from an external source.

When especially high requirements as to purity must be met in a bromide derivative produced according to the invention in the absence of a solvent it can be advantageous to add finely divided inert adsorbent materials such as active carbon, kieselguhr and aluminum oxides to the reaction mixture after completion of the bromination and binding of the excess free bromine. In addition, when purer end products are desired small quantities of solid alkaline reacting substances can also be added to the reaction mixture after completion of the bromination. Alkali metal hydroxides have proved particularly suited for this purpose but alkali metal carbonates or calcium oxide can also be used.

In processing a reaction mixture obtained in the bromination in the presence of a solvent, the reaction mixture after binding of the excess free bromine is first washed with water or an aqueous sodium carbonate or ammonia solution to render it acid free. After separation of the aqueous phase from the organic phase, the latter is treated with a usual drying agent such as silica gel, bleaching earth or similar materials and the drying agent removed therefrom, expediently, by filtration.

Subsequent to the purification procedures indicated above the reaction mixture is distilled under vacuum. The bromine derivates thus obtained as solid substances or as yellowish liquids are of such high viscosity that they hardly flow at room temperature. The bromine content of the bromine derivates produced according to the invention in each instance is nearly the theoretical. For example, in the case of pentabromodiphenyl ether produced according to the invention it is between 69 and 70.5% by weight and in the case of pentabromodiphenyl it is between 71 and 72.5%. The bromine derivates produced according to the invention may in addition contain small quantities, not over 3% and mostly not over 1% by weight of aromatically bound chlorine. Both the chlorine free bromine derivates as well as those containing the indicated small quantities of bound chlorine are suitable for flameproofing of combustible synthetic resins such as polyethylenes, polymethanes, polyesters, epoxy resins, polymethacrylates, and their copolymers. The small chlorine content indicated is not disturbing as it does not produce any detrimental influence on the effectiveness of the bromine derivates and does not damage the flameproofed synthetic resins. The bromine derivates which are obtained in the form of highly viscous liquids are especially suited for incorporation in the synthetic resins and reduce the combustibility of such synthetic resins considerably. If desired, they can be used in conjunction with other fire retarding substances such as antimony trioxide.

In contrast to other processes in which aromatics also are brominated in the absence or presence of solvents, the process according to the invention has the advantage that the bromination reaction after quick initiation proceeds to completion very rapidly. In the process according to the invention the reaction mixture can be processed immediately after the bromination has ended without requiring an after reaction period such as is required in the known processes. In addition, the bromine derivates can be produced according to the invention with the use of only an extremely small excess of bromine and are free of toxic and odoriferous substances.

The bromine derivates produced according to the invention may still also contain a small quantity of aromatics brominated to a lesser degree, which if desired can be removed by known procedures such as fractional distillation under vacuum or recrystallization from metal solvents. After such removal the bromine derivates are obtained in pure crystalline form.

The following examples will serve to illustrate the invention with reference to a number of embodiments thereof. In such examples the proportions are given in parts or percent by weight unless otherwise specified.

EXAMPLE 1

280 parts of diphenyl ether were mixed with 0.4 part of iron powder. 700 parts of bromine and 292 parts of chlorine were supplied to such mixture, care being taken that a slight excess of bromine with reference to the chlorine was always present in the reaction mixture. The reaction mixture was maintained at 30 to 60° C. during the supply of the halogens thereto. After completion of the bromination 84 parts of ethylene were introduced into the reaction mixture to bind the excess bromine and thereafter 5 parts of solid sodium hydroxide and 5 parts of finely divided kieselguhr added thereto.

The reaction mixture was then subjected to distillation under a pressure of 0.2 mm. Hg. After separating off the first runnings which essentially consisted of ethylene dibromide, 895 parts of a practically odorless product distilled over at 205–225° C. The distillate thus obtained contains 69.4% bromine and only small quantities of chlorine.

EXAMPLE 2

(a) Process according to invention:

280 parts of diphenyl ether were dissolved in 550 parts of ethylene bromide and 0.4 part of iron powder and 0.2 part of water added to such solution. Then 700 parts of bromine and 300 parts of chlorine were introduced into such mixture with vigorous stirring over a period of 2 hours in such a way that the reaction mixture always contained bromine in slight excess over the chlorine. During the introduction of the bromine and chlorine the temperature of the reaction mixture rose from room temperature to 550° C. and was maintained at the latter temperature. Directly after the introduction of the halogens had been completed about 8.5 parts of ethylene were passed into the reaction mixture. Thereafter the reaction mixture was washed with water until it was acid free. The organic layer after separation from the aqueous layer was dried with bleaching earth. After the bleaching earth was filtered off, the solvent was separated from the pentabromodiphenyl ether by distillation under vacuum. 900 parts or 97% of theory of pentabromodiphenyl ether were thus obtained as a light yellow very viscous and practically odorless liquid containing 70.1% of bromine and 0.9% of chlorine. In addition 600 parts of ethylene bromide were recovered which could be reused as solvent.

(b) Comparative test according to prior process using carbon tetrachloride as solvent:

280 parts of diphenyl ether were dissolved in 561 parts of carbon tetrachloride and 2 parts of iron powder and 1.5 parts of iron (III) bromide added thereto. Then 700 parts of bromine and 300 parts of chlorine were introduced into such mixture with vigorous stirring over a period of 3 hours as indicated under 2. After completion of the introduction of the halogens it was necessary to let the reaction mixture stand for a further 14 hours to permit after reaction. The reaction mixture was then stirred together with 215 parts of an aqueous sodium bisulfite solution. The organic phase was then separated off and washed with water until acid free and after again being separated from the aqueous phase dried with bleaching earth. After the bleaching earth was filtered off the solvent was separated from the pentabromodiphenyl ether by distillation under vacuum. 810 parts or 87.2% of theory of pentabromodiphenyl ether were thus obtained as a brownish strong smelling liquid containing 64.4% of bromine and 2.2% of chlorine. Only 400 parts of contaminated $CCl_4$ or 71.3% of the original quantity were recovered and these could only be reused to a limited extent.

EXAMPLE 3

280 parts of diphenyl ether were dissolved in 400 parts of ethylene bromide and 0.5 part of iron powder and 0.5 part of water added thereto. Then 670 parts of bromine and 295 parts of chlorine was introduced into such mixture under the same conditions as in Example 2a. Directly after introduction of the halogens had been completed about 2.5 parts of ethylene were passed into the reaction mixture and the reaction mixture processed as in Example 2a. 892 parts or 96% of theory of pentabromodiphenyl ether were obtained as a light yellow, practically odorless very viscous liquid containing 70% of bromine and 0.7% of chlorine. In addition 410 parts of ethylene bromide were recovered which could be completely reused as solvent in further batches.

EXAMPLE 4

280 parts of diphenyl ether were dissolved in 415 parts of propylene dibromide and 0.4 part of iron powder and 0.2 part of water added thereto. Then 700 parts of bromine and 292 parts of chlorine were introduced into such mixture under the same conditions as in Example 2a. After completion of the introduction of the halogens about 15 parts of propylene were passed into the reaction mixture and the reaction mixture then processed as in Example 2a. 820 parts of pentabromodiphenyl ether containing 69.5% of bromine and 1.0% of chlorine were obtained as a practically odorless, light yellow, highly viscous liquid. In addition 420 parts of reusable propylene dibromide were recovered.

EXAMPLE 5

280 parts of diphenyl ether were dissolved in 415 parts of 1,2-dichloroethane and 0.4 part of iron powder added thereto. Then 700 parts of bromine and 300 parts of chlorine were introduced into such mixture over a period of 2 hours under the same conditions as in Example 2a. After the bromination had ended the excess bromine contained in the reaction mixture was bound by pouring in ethylene. After the reaction mixture was filtered, washed acid free and dried the solvent contained therein was distilled off and reused. 880 parts of pentabromodiphenyl ether with a bromine content of 70.4% and a chlorine content of 1% remained as the light yellow, very viscous, practically colorless liquid end product.

EXAMPLE 6

308 parts of diphenyl were dissolved in 800 parts of ethylene bromide and 4 parts of iron powder added thereto. Then 1,430 parts of bromine and 632 parts of chlorine were introduced into such mixture in the manner described in Example 2a. During such introduction the temperature of the reaction mixture ranged from 20 to 60° C. After the bromination had ended the excess bromine contained in the reaction mixture was bound by pouring in ethylene. A pasty reaction mixture resulted which was filtered. The ethylene bromide obtained as the filtrate could be reused as solvent without requiring any purification. The solid which was filtered off was washed with ethanol and dried. 1,470 parts of octabromodiphenyl containing 80.9% of bromine and 1.5% of chlorine were obtained. This corresponds to a yield of 93.5% of theory.

EXAMPLE 7

247 parts of mixtures of diphenyl ether and diphenyl in the proportions indicated in the following table were each dissolved in 550 parts of ethylene bromide. Then 1,150 parts of bromine and 510 parts of chlorine were introduced at 60° C. into each of such solutions in such a manner that a slight excess of bromine over chlorine was always maintained in the reaction mixture. While the halogens were introduced a total of 0.4 part of iron powder and 0.2 part of water were introduced into the reaction mixture portionwise. After the bromination ended the ethylene was introduced into the reaction mixture to bind the excess free bromine contained therein. The reaction mixtures were then washed acid free with water, dried and filtered and the bromination products recovered from the filtrates in a combination of a climbing film and spray evaporator. The yields obtained are indicated in the following table:

*Table*

| Diphenyl, percent | Diphenyl ether, percent | Yield, percent of theory | Bromine Content, percent | Chlorine Content, percent |
|---|---|---|---|---|
| 10 | 90 | 88.8 | 78.8 | 1.3 |
| 10 | 90 | 90.1 | 80.9 | 1.5 |
| 40 | 60 | 89.9 | 78.8 | 1.0 |
| 40 | 60 | 90.0 | 80.3 | 1.5 |
| 60 | 40 | 93.5 | 78.0 | 2.0 |
| 60 | 40 | 91.2 | 80.4 | 1.5 |
| 80 | 20 | 89.3 | 78.2 | 0.7 |
| 80 | 20 | 90.7 | 78.3 | 1.6 |

I claim:

1. In a process for the bromination of a material selected from the group consisting of diphenyl, diphenyl ether and mixtures thereof for the introduction of more than 3 bromine atoms per molecule of such material by contacting such material with 1.01 to 1.2 gram atoms of bromine for every gram atom of hydrogen to be substituted in such material and with an amount of chlorine which at most is equimolar with respect to the bromine, the step which comprises, after completion of the bromination, introducing a quantity of an alkylene of 2-4 carbon atoms into the reaction mixture which is at least equimolar with respect to the free bromine still contained in such reaction mixture to bind such free bromine with the formation of the corresponding alkylene dibromide.

2. The process of claim 1 comprising in addition contacting such reaction mixture after the free bromine therein is bound with at least 1% by weight of a solid alkaline reacting substance.

3. The process of claim 2 in which said alkaline reacting substance is an alkali metal hydroxide.

4. The process of claim 1 in which said alkylene is ethylene.

5. The process of claim 1 in which said alkylene is propylene.

6. In a process for the bromination of a material selected from the group consisting of diphenyl, diphenyl ether and mixtures thereof for the introduction of more than 3 bromine atoms per molecule of such material by contacting such material with 1.01 to 1.2 gram atoms of bromine for every gram atom of hydrogen to be substituted in such material and with an amount of chlorine which at most is equimolar with respect to the bromine, the steps which comprise carrying out such bromination in the presence of an alkylene dihalide of 2-4 carbon atoms as solvent for the material to be brominated and after completion of the bromination introducing a quantity of an alkylene of 2-4 carbon atoms into the reaction mixture which is at least equimolar with respect to the free bromine still contained in such reaction mixture to bind such free bromine with the formation of the corresponding alkylene dibromide.

7. The process of claim 6 in which said alkylene dihalide is ethylene dibromide and said alkylene is ethylene.

8. The process of claim 6 in which said alkylene dihalide is propylene dibromide and said alkylene is propylene.

9. The process of claim 6 in which said bromination is carried out at a temperature between 20 and 65° C.

10. The process of claim 9 in which said bromination is carried out in the presence of water in an amount of 0.005 to 1.0% by weight of the reaction mixture.

References Cited by the Examiner
UNITED STATES PATENTS

| 2,022,634 | 11/1935 | Britton et al. | 260—612 |
| 2,591,498 | 4/1952 | Betts et al. | 260—663 X |
| 3,012,035 | 12/1961 | Knowles et al. | 260—612 X |

LEON ZITVER, *Primary Examiner.*

B. HELFIN, *Assistant Examiner.*